Oct. 7, 1958  H. S. MILLER  2,854,766
QUICK ADJUSTABLE ANGLE BLADE FOR SMALL GARDEN TRACTOR
Filed Dec. 28, 1955  3 Sheets-Sheet 1

INVENTOR
Henry S. Miller
G Ralph Burch
Attorney

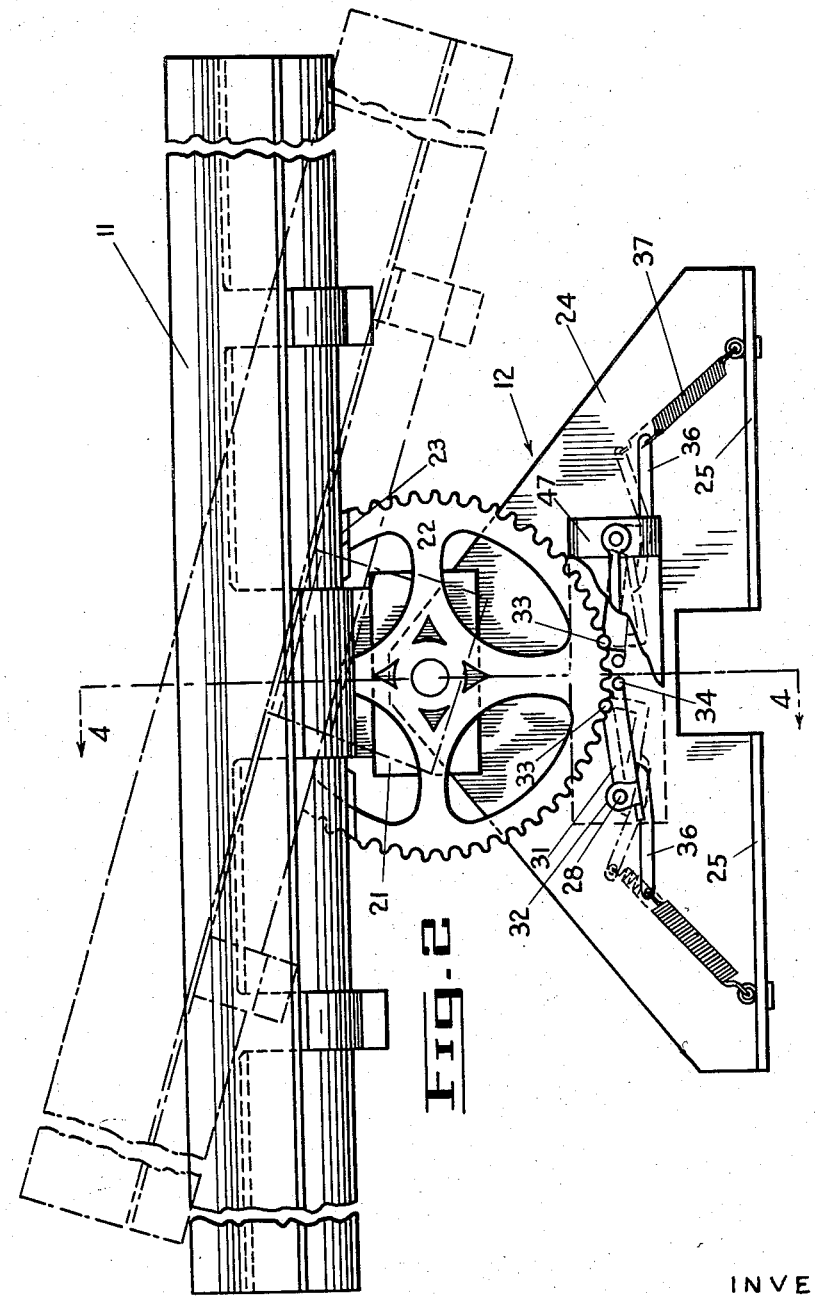

Oct. 7, 1958  H. S. MILLER  2,854,766
QUICK ADJUSTABLE ANGLE BLADE FOR SMALL GARDEN TRACTOR
Filed Dec. 28, 1955  3 Sheets—Sheet 3
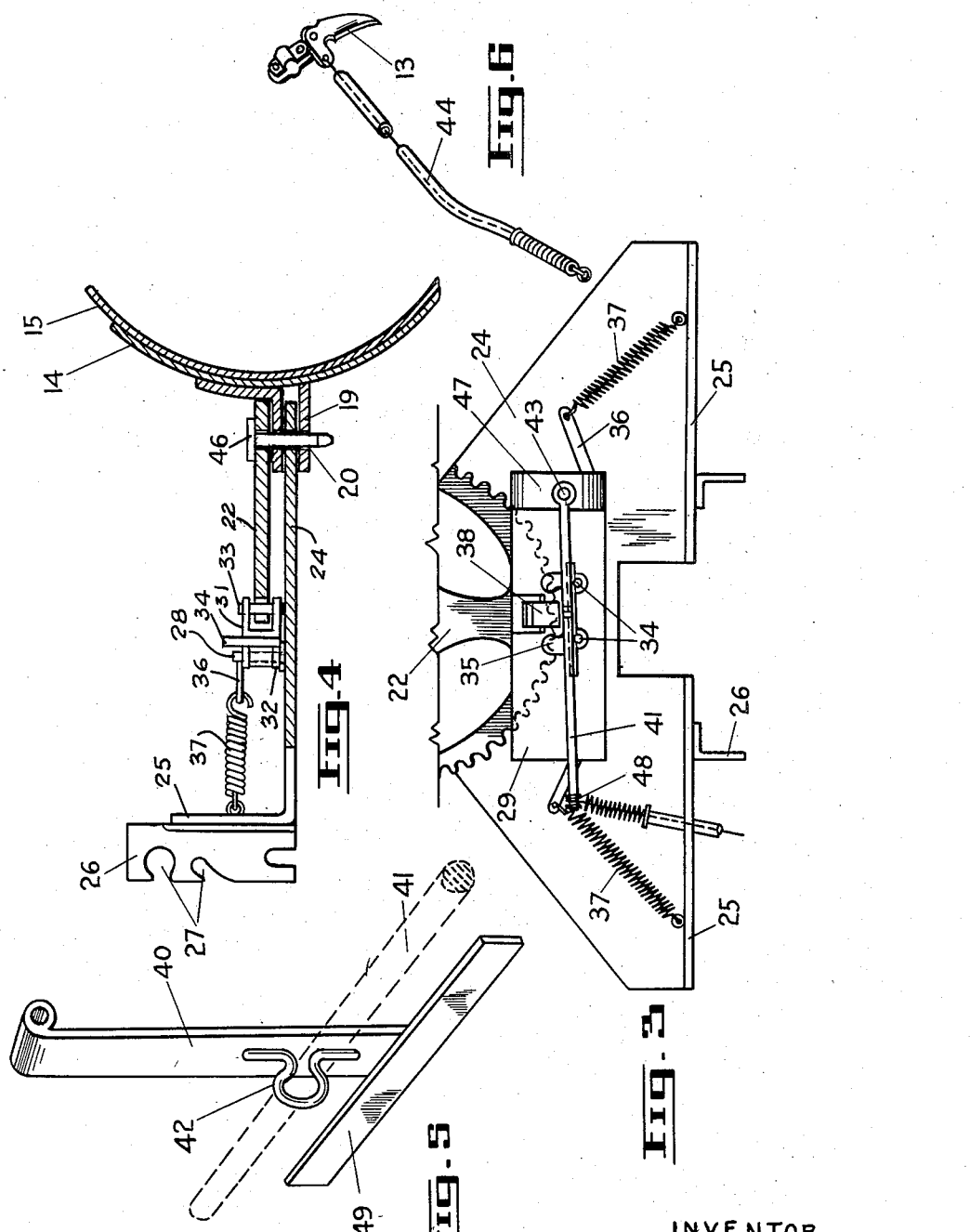
INVENTOR
Henry S. Miller
Ralph B Burch
Attorney

United States Patent Office 2,854,766
Patented Oct. 7, 1958

2,854,766

QUICK ADJUSTABLE ANGLE BLADE FOR SMALL GARDEN TRACTOR

Henry S. Miller, Huntsville, Ontario, Canada

Application December 28, 1955, Serial No. 555,996

3 Claims. (Cl. 37—42)

This invention refers generally to garden tractor attachments and more specifically to a bulldozer blade attachment especially adaptable for snow plowing.

Snow plow attachments for garden tractors are available on the market. However these attachments have several disadvantages when considering their use as ploughs for such as driveways and pathways. The blades at present in use for such purposes may or may not be adjustable, in any event their adjustment requires manual manipulation of the blade, and the degree and multiplicity of adjustments are very limited.

It is the main object of this invention to construct a blade attachment for garden tractors or similar type vehicles wherein the blade may be adjusted to a plurality of different angles by a control lever remote from the blade.

It is a further object of the invention to construct a blade attachment having the above characteristics wherein the blade angle may be changed by the operator while the tractor is in motion and wherein the control lever is located along with other controls of the vehicle.

Other objects of the invention will be apparent from the following description when taken in conjunction with the appended drawings in which:

Figure 2 is an enlargement of the device shown in Fig. 1;

Figure 3 is a plan view of the blade adjustment mechanism;

Figure 4 is a sectional elevation of the device taken along the line 4—4 of Fig. 2;

Figure 5 is a perspective view of part of the blade adjustment control linkage;

Figure 6 is an isolated view of the control lever and cable.

Figure 1:
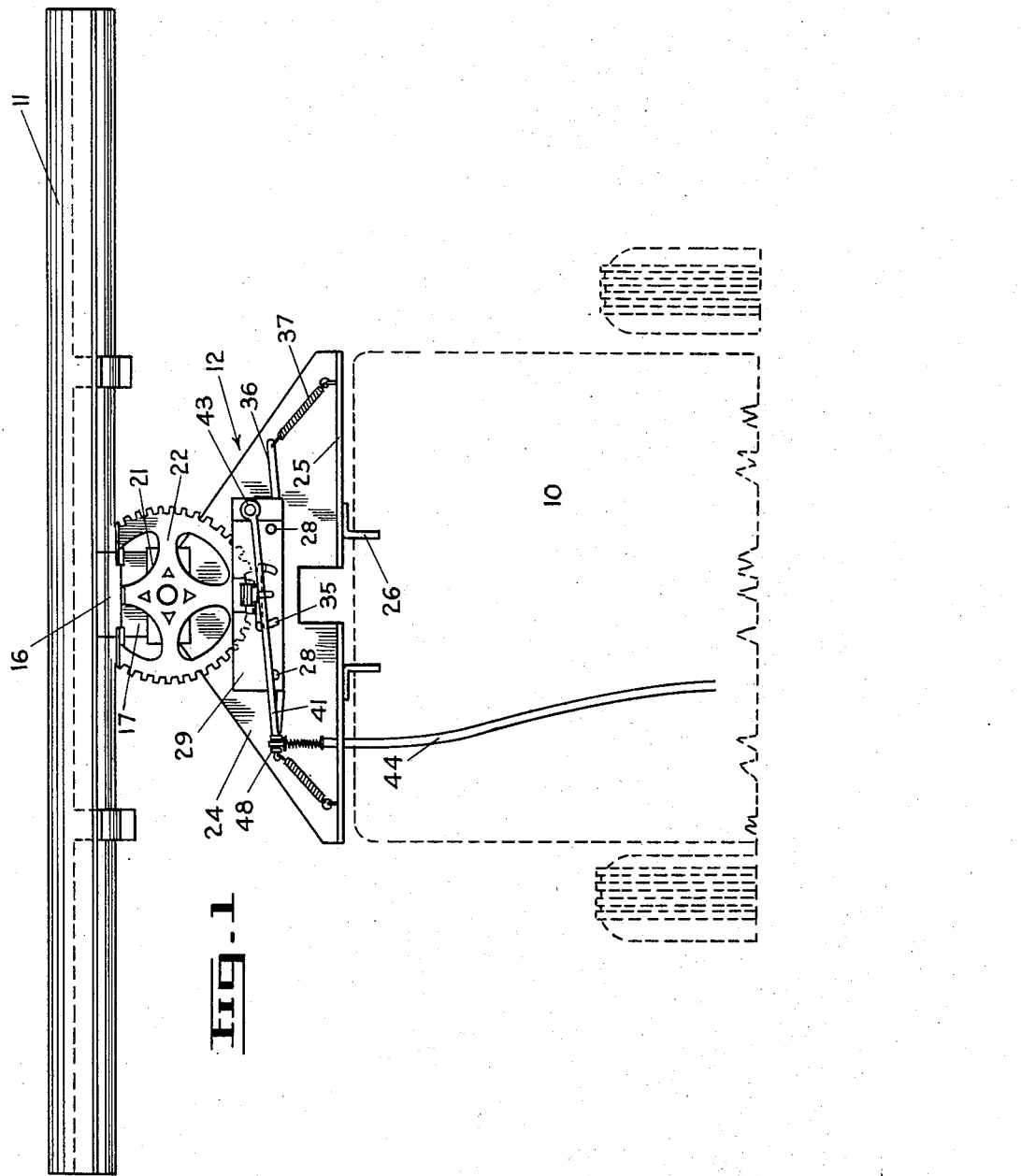
Figure 1 is a plan view of the blade device assembled on a garden tractor.

Referring more particularly to the drawings and especially to Figs. 2 and 4, wherein like parts are designated by like numerals of reference throughout the several views, numeral 10 represents a tractor or similar vehicle. The attachment comprises a blade 11, and adjustment and securing unit 12 which is operated by a control lever 13 secured to handle bar of the tractor.

The blade 11 is constructed of two sheets of steel plate 14 and 15. These plates are welded or otherwise secured together to form a blade having an arcuate cross section of generally conventional form. An L-shaped bracket 16 is welded centrally to the rear plate 14 of the blade. The free arm of the bracket extends horizontally as at 17 and has a hole 18 drilled therein. A second bracket or plate 19 is welded to the rear plate 14 having a horizontally disposed section parallel with and vertically displaced below the arm 16, the said section having a hole 20 vertically alined with hole 18. A small rectangular plate 21 is secured to the top surface of arm 17 and acts to strengthen the bracket and provide a rigid and extended base for a serrated or toothed gear segment 22. The toothed gear segment is welded to the plate 21 and is located with its center alined with holes 18 and 20. A section of the gear has been cut away as shown at 23 and the chord formed may be welded to the rear plate 14 of the blade.

The blade adjustment unit 12 comprises a triangular shaped base plate 24 having an upwardly turned side forming a flange 25. Attaching means such as two brackets 26 are welded or riveted vertically to the outer side of flange 25, the said bracket forming the means for attaching the device to the tractor. Two pivot posts 28 are secured at one end to the top of the plate 24 and are located symmetrically on either side of the center line 4—4 of the plate. The posts have a turned boss at their end and receive a rectangular plate 29 mounted longitudinally of the posts and parallel to the base plate 24. The plate is releasably secured to the posts by nuts 30. The posts pivotally mount two levers. Each lever has a channel shaped section 31 having a sleeve 32 vertically secured to one end of the channel section, the said sleeve being received by the post 28, and located between the plate 29 and the base 24. At the inner end of the channel a peg 33 is vertically mounted between the flanges of the channel section and is adapted for engagement between the teeth of the gear segment 22. A further post 34 is secured to the extreme end of the channel 31, and projects vertically through an arcuate slot 35 cut in the plate 29. A lever extension arm 36 projecting horizontally to the base, is rigidly secured at one end to the channel section. The other end is biased towards the corresponding upwardly turned flange 25 by a tension spring 37. A channeled arm 38 welded at one end to the front center of plate 29 projects upwardly, and rearwardly so that its other end is disposed vertically above the center of the said plate. The arm 38 is bifurcated at its upper end to receive a horizontally disposed pivot 39 which swingingly supports a T-shaped member 40. The horizontal arm 49 of the T member 40 engages the two posts 34 for movement rearwardly of the adjustment unit. This member is operated by a horizontally disposed lever 41 which passes through an attaching ring 42 secured to the rear of the T member 40. The lever 41 is pivoted at one end to a vertically disposed lug 43. The lug is secured above one end of the plate 29 by a U-shaped bracket 47 welded to the said plate. The free end 48 of lever 41 is attached to an operating cable 44 controlled by the lever 13 secured to the control or steering arm of the tractor.

The forwardly extending corner of the base plate is drilled at 45, and is received between brackets 17 and 19 where it is pivotally retained by an assembly pin 46. The said pin projects vertically through the center of the gear segment 22 and holes 18 and 20.

The operation of the device is as follows:

The blade unit is held in any angular position by pegs 33 which are biased by springs 37 for engagement between the teeth of the wheel 22, and prevent the rotation thereof about the assembly pin 46. The blade angle is changed while in motion by allowing the loading of the blade caused by the snow, or material being moved, to increase on the side of the desired direction of blade angling. The control lever 13 is then closed. This action pulls at the end 48 of the lever 41, and tends to rotate the same in an anti-clockwise direction about the pivot 43 (see Fig. 3). The T member 40 is caused to swing rearwardly about pivot 39, and the cross bar 49 of the T member contacts the posts 34 and moves them rearwardly along the slots 35. The posts 34 being attached to members 31 and 36 rotate the same about the posts 28 in a clockwise direction against the action of the springs 37. Thus the pegs 33 are temporarily withdrawn from engagement with the teeth of the gear segment 22, and the blade will rotate in the required direction until the lever 13 is released, when the pegs 33 biased by the springs 37 will take up fresh grooves in the gear segment and lock the blade in the new position.

It will be readily appreciated that this adjusting feature of my invention provides considerable versatility in operation, hitherto unobtainable in such blade attachments.

While one embodiment of the invention has been illustrated and described in considerable detail, it will be understood that various changes, and modifications may be made without departing from the spirit of the invention.

The embodiments of the invention in which an exclusive property or privilege is claimed are defined as follows.

I claim:

1. In a blade attachment for tractors comprising a blade, a gear segment secured to the rear center of said blade, a pivotal mounting for said gear segment, a base plate attached to the tractor supporting said pivotal mounting, vertical posts mounted on said base plate, levers rotatably mounted on said posts, pegs secured to one end of said levers, springs attached to the other end of said levers and biasing said pegs into engagement with the teeth of said gear segment, a T-shaped bar pendulously supported above said pegs having a horizontal arm in contact with one end of said levers, and means for moving said bar to swing said levers to disengage said pegs from engagement with the teeth of said gear segment.

2. In a blade attachment for tractors as described in claim 1 wherein said means includes a lever pivotally mounted at one end and extending across said T-shaped bar and a pull cable attached to the opposite end of said last-mentioned lever.

3. In a blade attachment for tractors comprising a blade, a gear segment attached to and extending rearwardly from the center of said blade, a pivotal mounting for said gear segment, a base plate attached to the tractor supporting said mounting, levers rotatably mounted on said base plate, pegs carried by one end of said levers for engagement with the teeth of said gear segment, means normally swinging said levers to engage said pegs with the teeth of said gear segment, a bar pendulously supported above said pegs having contact with said levers, and means for moving said bar to swing said levers to disengage said pegs from the teeth of said gear segment.

References Cited in the file of this patent

UNITED STATES PATENTS

| | | |
|---|---|---|
| 685,384 | McDonald | Oct. 29, 1901 |
| 1,195,271 | Ruth | Aug. 22, 1916 |
| 1,524,639 | Grady | Jan. 27, 1925 |
| 2,251,452 | Hirst | Aug. 5, 1941 |